United States Patent
Lee, IV et al.

(10) Patent No.: US 8,714,113 B2
(45) Date of Patent: *May 6, 2014

(54) BARK DETERRENT APPARATUS WITH INTERNAL VIBRATION SENSOR

(75) Inventors: Albert Leon Lee, IV, Seymour, TN (US); Patrick Allan Tyndall, Simpsonville, SC (US); David Alan Weston, Hendersonville, NC (US)

(73) Assignee: Radio Systems Corporation, Knoxville, TN (US)

(*) Notice: Subject to any disclaimer, the term of this patent is extended or adjusted under 35 U.S.C. 154(b) by 832 days.

This patent is subject to a terminal disclaimer.

(21) Appl. No.: 12/204,800

(22) Filed: Sep. 4, 2008

(65) Prior Publication Data

US 2010/0050954 A1    Mar. 4, 2010

(51) Int. Cl.
*A01K 15/00* (2006.01)
*A01K 27/00* (2006.01)

(52) U.S. Cl.
USPC .......................................... 119/718; 119/719

(58) Field of Classification Search
USPC .................................. 119/712, 718, 719, 720
See application file for complete search history.

(56) References Cited

U.S. PATENT DOCUMENTS

| | | | |
|---|---|---|---|
| 4,947,795 A | 8/1990 | Farkas | |
| 5,601,054 A | 2/1997 | So | |
| 5,749,324 A * | 5/1998 | Moore | 119/719 |
| 5,927,233 A | 7/1999 | Mainini et al. | |
| 6,058,889 A | 5/2000 | Van Curen et al. | |
| 6,205,872 B1 * | 3/2001 | Pflueg | 73/866.5 |
| 6,668,760 B2 | 12/2003 | Groh et al. | |
| 6,860,240 B2 * | 3/2005 | Kim et al. | 119/719 |
| 6,907,844 B1 * | 6/2005 | Crist et al. | 119/718 |
| 6,928,958 B2 | 8/2005 | Crist et al. | |
| 7,000,570 B2 * | 2/2006 | Napolez et al. | 119/718 |
| 7,198,009 B2 * | 4/2007 | Crist et al. | 119/718 |
| 7,222,589 B2 | 5/2007 | Lee, IV et al. | |
| 7,252,051 B2 | 8/2007 | Napolez et al. | |
| 7,900,585 B2 * | 3/2011 | Lee et al. | 119/719 |
| 7,946,252 B2 * | 5/2011 | Lee et al. | 119/718 |
| 8,342,134 B2 * | 1/2013 | Lee et al. | 119/718 |
| 2005/0145196 A1 | 7/2005 | Crist et al. | |

* cited by examiner

*Primary Examiner* — David Parsley
(74) *Attorney, Agent, or Firm* — Pitts & Lake, P.C.

(57) ABSTRACT

A bark deterrent apparatus with an internal vibration sensor. The probeless bark deterrent apparatus uses an internal mechanical vibration sensor that detects vibrations induced in the housing. The probeless bark deterrent apparatus eliminates the external probe used in conventional bark deterrent devices to pick up vibrations at the dog's throat and communicate them to a mechanical vibration sensor to be eliminated while still allowing accurate bark detection.

10 Claims, 8 Drawing Sheets

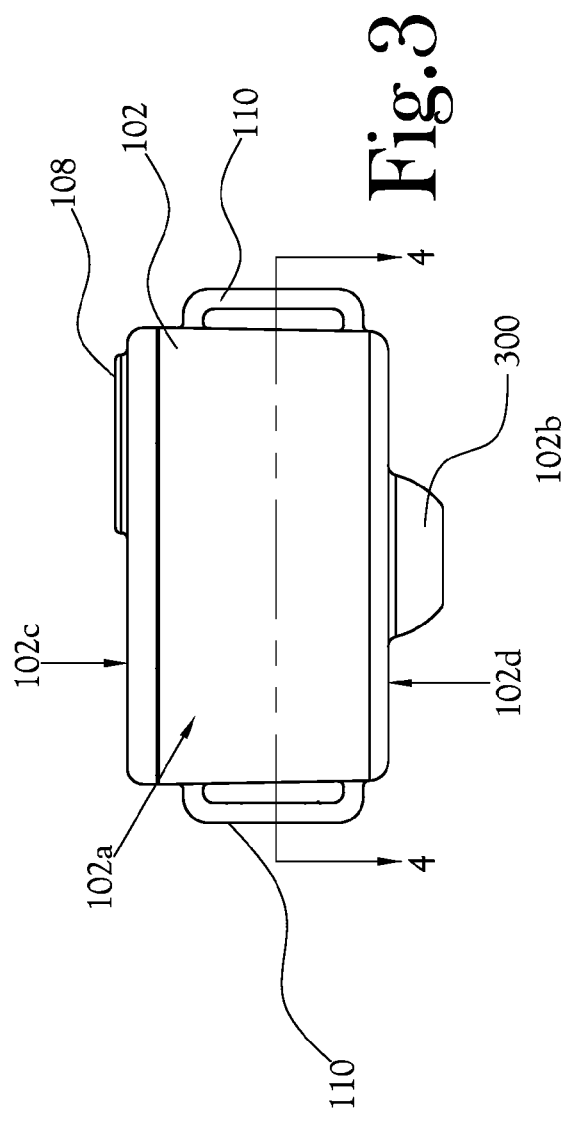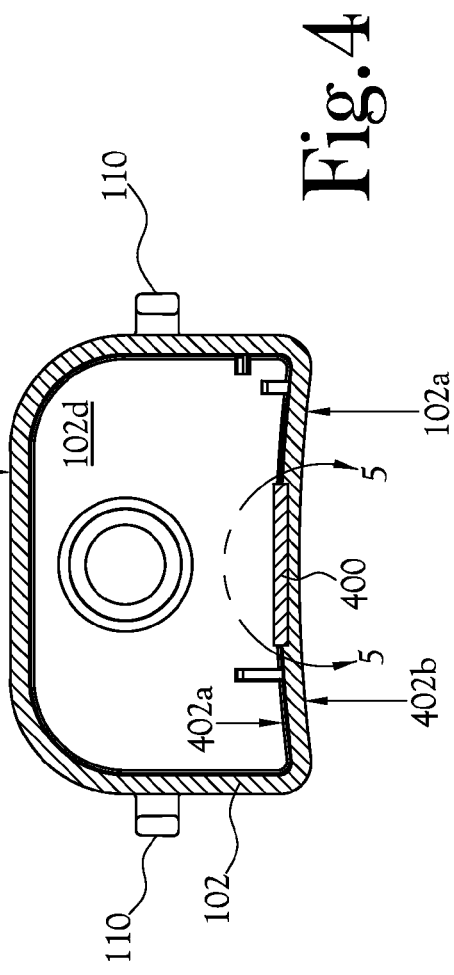

BARK DETERRENT APPARATUS WITH INTERNAL VIBRATION SENSOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The invention relates to an apparatus for deterring an animal from barking including a vibration sensor. More specifically, the invention relates to an apparatus for deterring an animal from barking with an internal vibration sensor.

2. Description of the Related Art

Nuisance barking is common problem for dog owners. One common solution is to use a bark deterrent apparatus that discourages the dog from barking. A conventional bark deterrent apparatus detects a dog's bark using an audio sensor, a mechanical vibration sensor, or a combination of these technologies. For clarification, as used herein, the term "vibration" refers to mechanical vibrations communicated by physical contact and the term "audio" refers to sound waves carried by air at frequencies within the range of human hearing. Both audio sensors and mechanical vibration sensors can be used for detecting barks and each has its own advantages and disadvantages. Mechanical vibration sensors are useful because they consume significantly less power than a microphone. However, conventional designs using a mechanical vibration sensor involve the use of an external probe to couple the vibrations in the dog's throat to the piezoelectric element.

The use of an external probe is an industry standard with proven effectiveness. In the prior art, the piezoelectric element is considered part of the electronics generally protected by locating it within the housing on a circuit board. Commercially effective bark deterrent devices continue to use an external, protruding vibration probe continues in mechanical vibration sensors despite the limitations and perceptions associated with them based on a need to maintain a physical connection between the piezoelectric element and the dog's throat to effectively detect barks. Considerable effort has been spent by those in the art to develop the prior art bark sensors with external, protruding vibration probes that are currently used for bark detection.

It is instructive to understand the relationship of prior art bark sensors, protruding vibration probes, and electrodes to bark detection. First, electrodes are either rigid in design and exhibit virtually no movement when secured to the housing, effectively serving as extensions of the housing with respect to mechanical vibrations, or are compliant in design to relieve pressure, effectively serving to dampen vibrations. Prior art external, protruding vibration probes were designed to allow movement in response to mechanical vibrations. The prior art vibration probes include a rigid post in communication with a piezoelectric element and passing through an opening in the housing, a plastic probe cover screwed on to the exposed end of the rigid post and making physical contact with the dog's throat, an external O-ring to provide the primary waterproof seal while allowing the rigid post to move in response to vibrations from the dog's throat, and an internal O-ring to provide a secondary waterproof seal while allowing the rigid post to move in response to vibrations from the dog's throat. This design retains a risk of failure of the weatherproof seal potentially leading to damage of the internal circuitry. The O-rings also serve to isolate the vibration probe from the housing so mechanical vibrations introduced into the housing are not detected as bark signals. U.S. Pat. No. 6,668,760, issued to Groh, et al., on Dec. 30, 2003 describes the general construction of a prior art external, protruding vibration probe designed to have the vibration probe communicate only vibrations originating at the dog's throat and to avoid registering other events such as a branch striking the housing. This design allows the vibration probe to move independently of the housing.

In combination with the piezoelectric element and an optional amplifier, a vibration probe forms a prior art vibration sensor. To further eliminate unwanted vibrations, the prior art includes efforts to mechanically isolate the piezoelectric element from vibrations propagated through the housing, which is also described in U.S. Pat. No. 6,668,760. With the vibration probe isolated from the housing and the piezoelectric element isolated from the housing, any vibrations detected can be considered to have originated from the dog.

U.S. Pat. No. 5,927,233, issued to Christopher E. Mainini on Jul. 27, 1999 discloses prior art bark deterrent apparatus that delivers an electrical shock stimulus. The bark deterrent apparatus includes a housing attached to a collar worn about the dog's neck. There are three probes extending from the housing: two probes associated with delivering the electrical shock stimulus and one for communicating vibrations from the dog's throat to the internal piezoelectric element. The vibration sensor probe competes with the two adjacent electrode probes for contact pressure, sometimes requiring the collar tension to be increased. Understandably, the pet owner may be reluctant to properly tighten the collar because of the perceived discomfort caused by the probes even when the dog is not engaging in nuisance barking. A collar fitted too loosely results in an ineffective deterrent because the probes are not properly engaging the dog to deliver the electrical stimulus or pick up the vibrations at the dog's throat.

The addition of a vibration detection probe positioned between the two electrodes further complicates the process of ensuring a proper fit. Unless properly fitted, the vibration probe and one of the electrodes may adequately engage the dog's neck while the other electrode makes little or no contact and prevent an effective stimulus from being delivered. Even when fitted properly, the distribution of contact pressure between the vibration and the electrodes can result in reduced effectiveness of the stimulus. Also, a loosely fitted bark deterrent apparatus is susceptible to moving from the optimal training position centered on the dog's neck with the electrodes at the throat area. The central vibration probe unbalances the pair of electrodes and provides a pivot point that contributes to the movement from the optimal position.

U.S. Pat. No. 5,601,054, issued to Ho-Yun So on Feb. 11, 1997 combines the functions of delivering the electrical shock stimulus and the communication of vibrations into a single probe, which would eliminate the unbalancing caused by the central vibration probe. Alternately, U.S. Pat. No. 7,252,051, issued to Francisco J. Napolez, et al., on Aug. 7, 2007 adds an offset stabilizing post to balance the bark control device.

The perception and fitment issues may even be greater for pet owners who choose to use deterrents other than an electrical shock stimulus for various reasons. U.S. Pat. No. 6,668,760 also represents a prior art bark deterrent apparatus using a spray deterrent. Unlike an electrical shock stimulus, application of the spray deterrent does not require electrodes. Accordingly, the only probe on the bark deterrent apparatus is the vibration probe. Even when only one external probe exists, the perception of discomfort remains. Further, having only one probe extending from the housing creates a pivot point on which the bark deterrent apparatus may rock in any direction.

In addition to construction, fitment, and perception issues, there is a quality issue. The bark waveforms obtained using prior art vibration probes are of lower quality than can be obtained using higher quality audio transducers such as condenser, capacitor, or electrostatic microphones. However, the higher quality audio transducers require significant power and tend to quickly deplete limited power supplies, such as batteries. In contrast, vibration transducers have low power consumption. Accordingly, vibration sensors have found use as triggering devices to wake up the microcontroller and the audio transducer for accurate bark detection. This arrangement improves battery life while retaining the ability to perform high quality bark detection. This technique is described in detail in U.S. Pat. No. 5,927,233. Audio transducers are also prone to picking up ambient sounds, including barks by another dog, which can result in false triggering. Because the vibration transducer responds primarily to contact vibrations, it is generally non-responsive to sound-induced vibrations excepting those produced at close range and loud volumes. The result is that the vibration sensor effectively responds only to events directly associated with the dog wearing the bark deterrent apparatus. Despite the higher quality bark signals obtainable from audio transducers, prior art vibration sensors have found use for bark detection in some entry-level training devices primarily based on the low power consumption, cost, and the ability to localize the source of the bark to dog wearing the collar.

Bark detection accomplished solely using vibration sensors is more susceptible to false triggers as a result of the lower quality bark signals obtained and the greater likelihood of vibrations transferred through the housing being interpreted as a bark, even when using O-rings to isolate the vibration probe. Often the level of false triggers rises to unacceptable levels because the undeserved corrections hamper effective training. To reduce the number of false triggers, U.S. Pat. No. 7,222,589, issued to Albert L. Lee, IV, et al., on May 29, 2007 discloses the application of vibration dampening coatings to the exterior of the housing in order to minimize the propagation of vibrations through the housing.

Finally, two variations of the external, protruding probe have been used. The first is the collar-mounted vibration transducer disclosed in U.S. Pat. No. 4,947,795, issued to Gregory J. Farkas on Aug. 14, 1990 in which the vibration transducer is held against the dog's neck by the collar. Few details about the vibration transducer are provided, but the disclosure suggests that the vibration transducer itself is placed in contact with the dog's throat to measure vibrations. The second is described in U.S. Pat. No. 7,252,051, issued to Francisco J. Napolez, et al., on Aug. 7, 2007 in which the vibration transducer is contacted by a covered probe referred to as a nipple formed on the underside of the dome-shaped membrane. Although effectively hidden by a membrane, the membrane-covered probe moves and transfers vibrations to the vibration transducer independently of the housing.

BRIEF SUMMARY OF THE INVENTION

This summary of a bark deterrent apparatus with an internal vibration sensor, or probeless bark deterrent apparatus, describes the scope and spirit of the present invention and is not intended to describe the features of present invention in detail or to limit the invention by what is included or excluded herein. The probeless bark deterrent apparatus uses an internal mechanical vibration sensor that detects vibrations induced in the housing. The probeless bark deterrent apparatus eliminates the external probe used in conventional bark deterrent devices to pick up vibrations at the dog's throat and communicate them to a mechanical vibration sensor to be eliminated while still allowing accurate bark detection. In general, the probeless bark deterrent apparatus offers improved comfort and appearance, more reliable electrode contact, more stable unit positioning, reduced weight, easier weatherproofing, and preventing misadjustment of the vibration sensor.

The housing provides the mechanical platform for the probeless bark deterrent apparatus. The housing is fabricated of a substantially rigid material that does not dampen vibrations. When worn, the dog-facing portion is generally placed in direct physical contact with the dog's throat and the top portion is generally oriented towards the dog's face/snout. In this orientation, the battery module is accessible without removing the probeless bark deterrent apparatus, the microphone opening is directed toward the dog's mouth, and the deterrent port is aimed at the dog's snout/nose/mouth. Without a protruding, external vibration probe, the inward portion comfortably rests against the dog's neck when the probeless bark deterrent apparatus is worn by the dog and proper collar tension is easier to achieve.

In operation, the probeless bark deterrent apparatus is secured to the neck of a dog using a collar or similar device and centered on the dog's throat. When the dog barks, the entire housing vibrates primarily due to direct physical contact between the electrodes/housing and the dog's vibrating throat and airborne sound waves making incident contact with the housing. The forces on the housing resulting from contact with the dog's throat have radial and lateral components, creating corresponding strains in the housing walls. Because the vibration transducer is bonded to the inside of the housing, the housing strains are coupled to the vibration transducer. When the vibration transducer experiences strain, it produces a corresponding electrical signal. The microcontroller analyzes the output of the signal and determines whether or not the signal actually represents a bark. Other non-bark events, such as scraping, bumping, or scratching the housing or collar, can cause strains on the housing and passed to the vibration transducer. Rejecting the extraneous signals produced by these events is essential to reliable bark detection.

BRIEF DESCRIPTION OF THE SEVERAL VIEWS OF THE DRAWINGS

The above-mentioned features of the invention will become more clearly understood from the following detailed description of the invention read together with the drawings in which:

FIG. 3 is a front elevation view of the embodiment of the probeless bark deterrent apparatus in FIG. 1;

FIG. 4 is a section view, taken at 4-4, of the embodiment of the probeless bark deterrent apparatus in FIG. 3 showing the location of the mechanical vibration transducer within the housing;

FIGS. 7A-12A are captures of time-domain waveforms of six different barks obtained using one embodiment of the probeless bark deterrent;

FIGS. 7B-12B show the frequency domain transforms and scaled versions of the captures of time-domain waveforms from FIGS. 7A-12A;

DETAILED DESCRIPTION OF THE INVENTION

A bark deterrent apparatus with an internal vibration sensor 100, or probeless bark deterrent apparatus, is shown and described in detail herein. The probeless bark deterrent apparatus uses an internal mechanical vibration sensor that detects vibrations induced in the housing. The probeless bark deterrent apparatus eliminates the external probe used in conventional bark deterrent devices to pick up vibrations at the dog's throat and communicate them to a mechanical vibration sensor to be eliminated while still allowing accurate bark detection. In general, the probeless bark deterrent apparatus offers several advantages over the prior art including improved comfort and appearance, more reliable electrode contact, more stable unit positioning, reduced weight, easier weatherproofing, and preventing misadjustment of the vibration sensor.

As used herein, the term "probeless" refers only to the absence of a probe external to the housing and providing a direct connection between a vibration sensor and the dog. Other probes, such as an electrode pair for delivering a stimulus, may still be present. Also, as used herein the term "vibration" refers to a sensor for detecting mechanical vibrations moving through a transmission medium other than air and the term "audio" refers to sound waves moving through air at frequencies within the range of human hearing.

Figure 1:
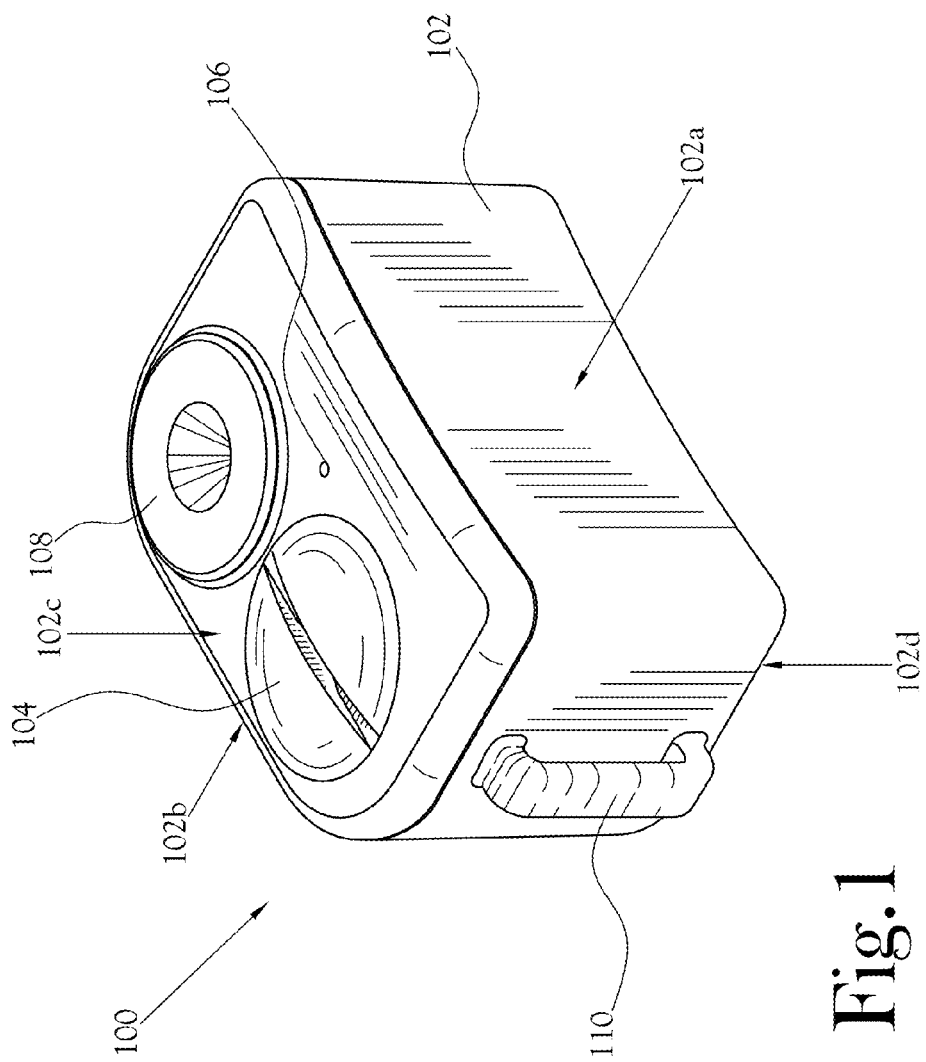
FIG. 1 is perspective view of a one embodiment of a probeless bark deterrent apparatus using a spray deterrent.

FIG. 1 is a perspective view of the exterior of one embodiment of the probeless bark deterrent apparatus 100 adapted to deliver a spray deterrent, such a citronella, to discourage the dog from continued barking. The housing 102 provides the mechanical platform for the probeless bark deterrent apparatus 100. More specifically, the housing 102 acts a container for the electromechanical system of the probeless bark deterrent apparatus 100 and also serves as part of the electromechanical system by picking up mechanical vibrations from the dog. The housing 102 is fabricated of a substantially rigid material, such as a polycarbonate material, that does not damped vibrations. In addition, there is no vibration dampening cover, coating, or overmold applied to the housing. In the illustrated embodiment, the housing 102 defines an opening for receiving a battery module 104, a microphone opening 106, a spray deterrent port 108, and a pair of collar loops 110. The housing generally defines an inward (dog-facing) portion 102a, an outward (environment-facing) portion 102b, a top portion 102c, and a bottom portion 102d. When worn, the dog-facing portion 102a is generally placed in direct physical contact with the dog's throat and the top portion 102c is generally oriented towards the dog's face/snout. In this orientation, the battery module 104 is accessible without removing the probeless bark deterrent apparatus 100, the microphone opening 106 is directed toward the dog's mouth, and the spray deterrent port 108 is aimed at the dog's snout/nose/mouth where the deterrent fluid will be most effective. Without a protruding, external vibration probe, the inward portion 102a comfortably rests against the dog's neck when the probeless bark deterrent apparatus 100 is worn by the dog and proper collar tension is easier to achieve.

The battery module 104 provides a source of power to the probeless bark deterrent apparatus 100. The microphone opening 106 allows sound waves to reach and be detected by an audio transducer. The spray deterrent port 108 provides an outlet that allows the release of a fluid deterrent intended to discourage continued barking. The collar loops 110 receive a strap or collar that allows the probeless bark deterrent apparatus 100 to be fitted to and worn by the dog, typically around the neck. One skilled in the art should recognize that these components can be varied or deleted and other components can be added without departing from the scope and spirit of the present invention. For example, the battery module might be rechargeable and non-replaceable allowing it to be located inside the housing. Other modifications include the omission of the audio transducer, which obviates the need for the microphone opening, and alternate methods of attaching the collar to the housing.

Figure 2:
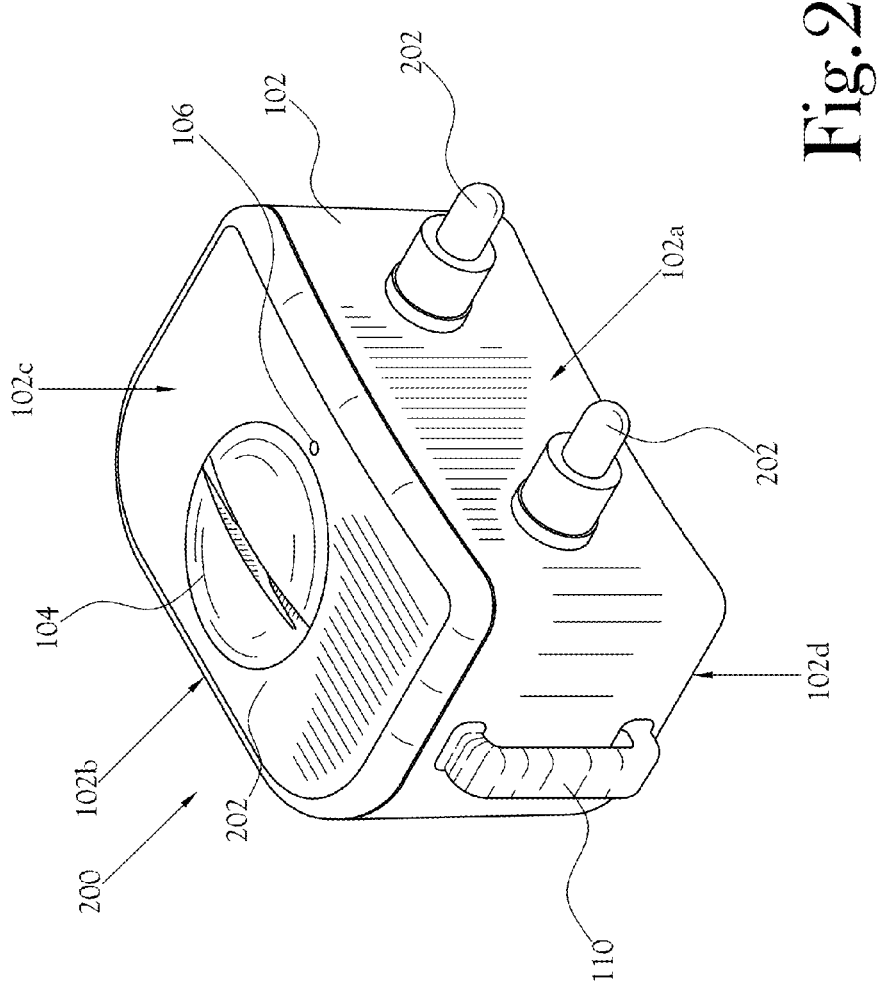
FIG. 2 is perspective view of another embodiment of a probeless bark deterrent apparatus using an electrical stimulus as a deterrent.

FIG. 2 illustrates an alternate embodiment of the probeless bark deterrent apparatus 200 adapted to deliver an electrical stimulus to discourage the dog from continued barking. In the illustrated embodiment, a pair of electrodes 202 extends from the inward portion 102a and will be placed in direct physical contact with the dog's throat when the probeless bark deterrent apparatus 100 is worn by the dog. Without a protruding, external vibration probe, the probeless bark deterrent apparatus 100 is fitted so that the pair of electrodes makes good physical contact with the animal's skin. This eliminates fitment issues where the vibration probe and one of the electrodes adequately engage the dog's neck while the other electrode makes little or no contact and prevents an effective stimulus from being delivered. Removing the vibration probe also reduces instances of the probeless bark deterrent apparatus 100 shifting positions as it pivots on the probe and electrodes.

FIG. 3 is a front elevation view of the embodiment of the probeless bark deterrent apparatus 100 of FIG. 1 showing a reservoir port 300 extending from the bottom portion 102d. In one embodiment, the reservoir port 300 defines an inlet allowing deterrent fluid to be added to a fixed reservoir. In another embodiment, the reservoir port 300 allows an empty reservoir to be removed and replaced with a full reservoir. The sectional view of FIG. 4 illustrates the interior of one embodiment of the housing 102 including the placement of the vibration transducer 400. The interior surface 402a and the exterior surface 402b are identified.

Figure 5:
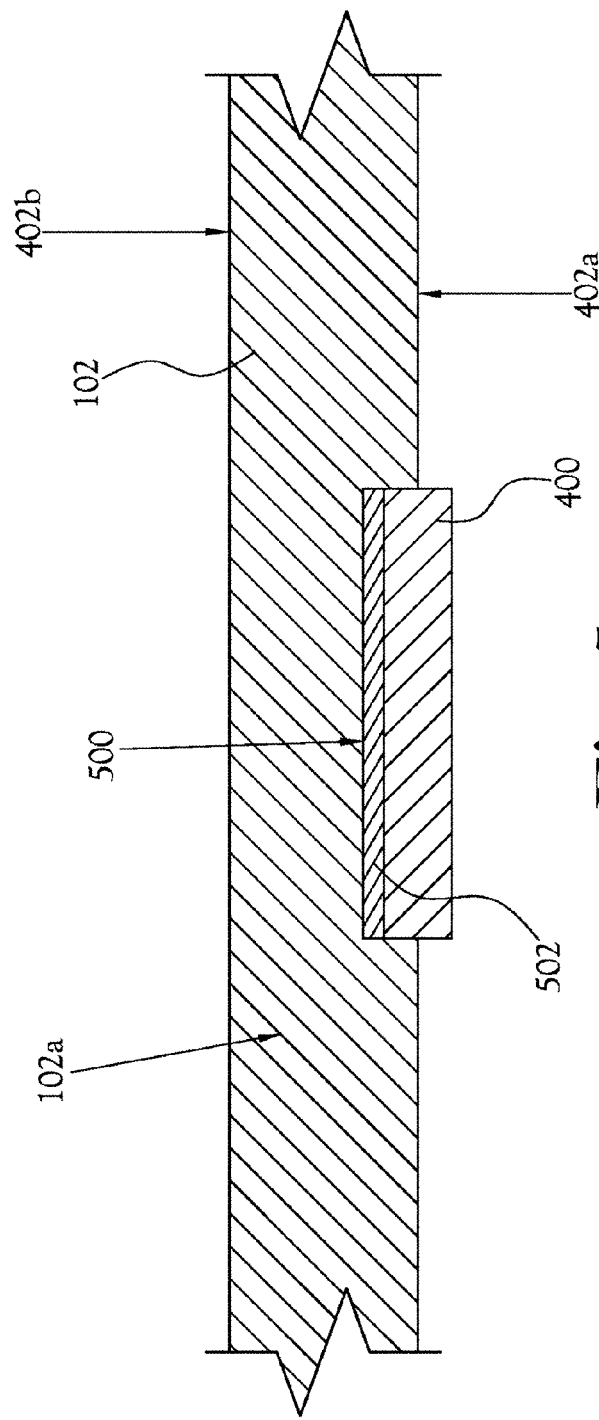
FIG. 5 shows the placement of the mechanical vibration transducer within the housing in greater detail.

FIG. 5 is a detail view of the inward portion 102a of one embodiment of the interior of the housing 102 around the vibration transducer 400. In the illustrated embodiment, the inward portion 102a of the housing 102 defines a cavity 500 open to the interior surface 402a. The cavity 500 is sized and shaped to receive the vibration transducer 400. In the illustrated embodiment, the vibration transducer 400 is mechanically secured in the cavity 500 with an adhesive 502 that substantially covers the mating surfaces of the vibration transducer 400 and the cavity 500. In an alternate embodiment, the interior surface of the housing does not define a cavity, and the vibration transducer is secured directly to the interior surface of the housing. In another alternate embodiment, a ridge extends from the interior surface of the housing.

The outer edge of the vibration transducer is bonded to the rim of the ridge leaving the remaining surface area of the vibration transducer suspended in air.

The bond between the mating surfaces of the vibration transducer 400 and the cavity 500 is designed to be effectively permanent and ensure at least adequate conduction of vibrations from the housing 102 to the vibration transducer 400. In one embodiment, the adhesive forms a thin layer that creates a bond without imposing any substantial physical barrier between the mating surfaces. One suitable adhesive of this type is a cyanoacrylate-based adhesive. In another embodiment, the adhesive reacts with the mating surfaces and effectively fuses them together. In a further embodiment, the adhesive layer exhibits some thickness but cures to a substantially rigid state that provides at least adequate conduction of the vibrations between the housing 102 and the vibration transducer 400. One suitable adhesive of this type is an epoxy resin. In one embodiment, the mating of the two surfaces is substantially complete so that substantially all of the surface area of one side of the vibration transducer 400 is effectively coupled with housing 102. This allows the vibration transducer 400 to convert strain and vibration on the housing 102 into electrical signals.

In another embodiment, the housing includes a slot into which the vibration transducer is inserted. The slot is sized such that vibration transducer is captive against the housing allowing it to sense vibrations and strain in the housing. Similarly, another embodiment uses a captive arrangement where two parts of the housing sandwich the vibration transducer in between when the two parts are assembled.

Figure 6:
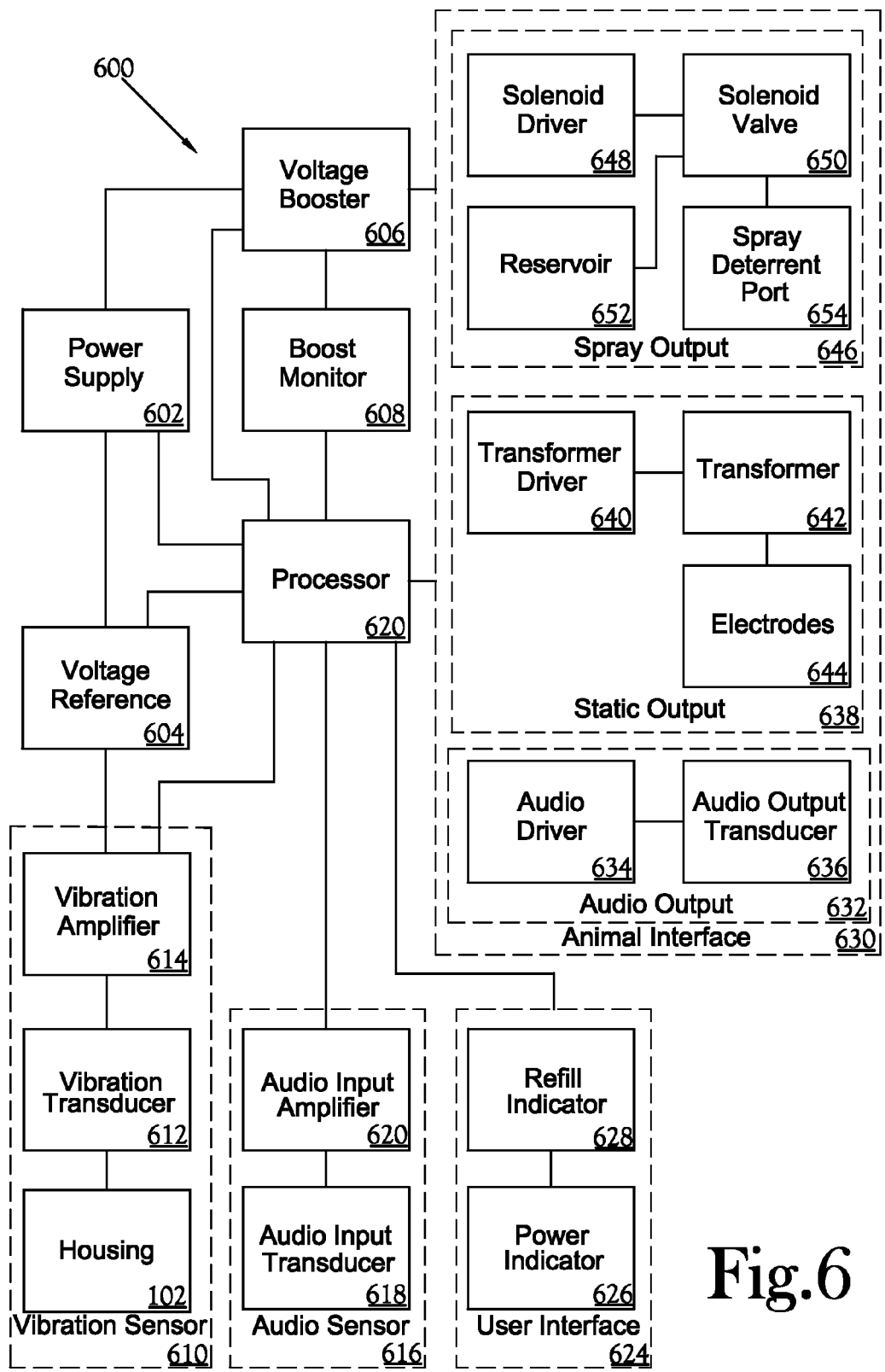
FIG. 6 is a block diagram of the electromechanical system of one embodiment of the bark deterrent apparatus.
Figures 7A, 7B:
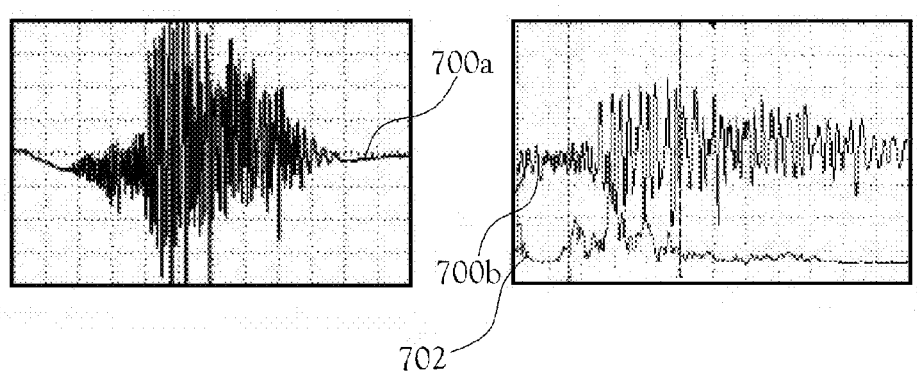
Figures 8A, 8B:
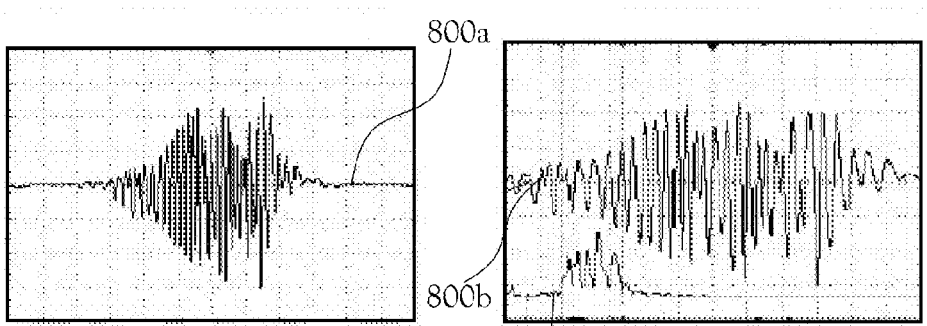
Figures 9A, 9B:
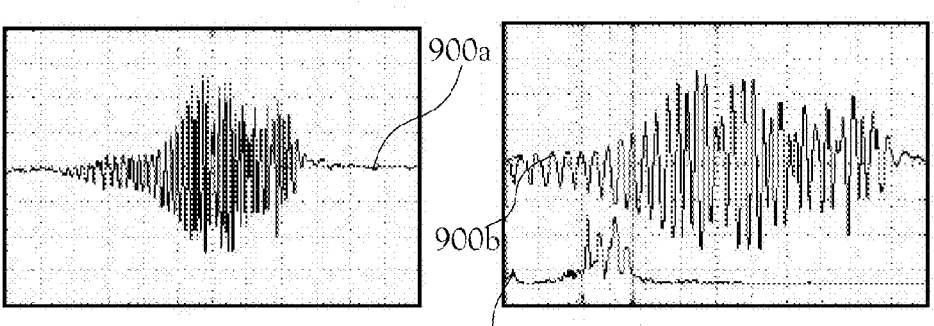
Figures 10A, 10B:
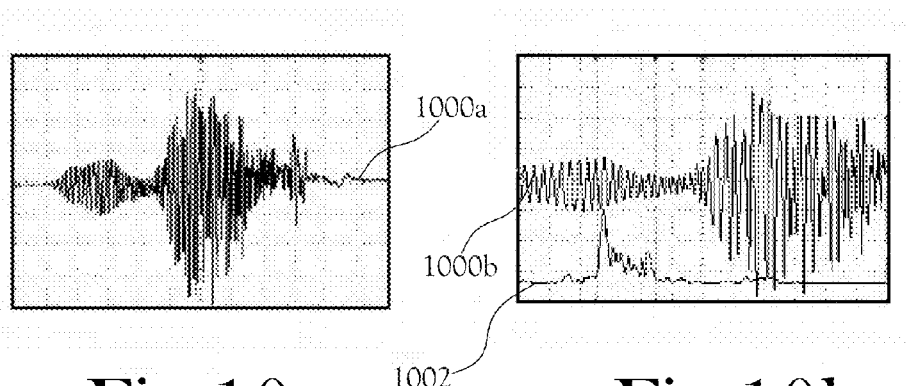
Figures 11A, 11B:
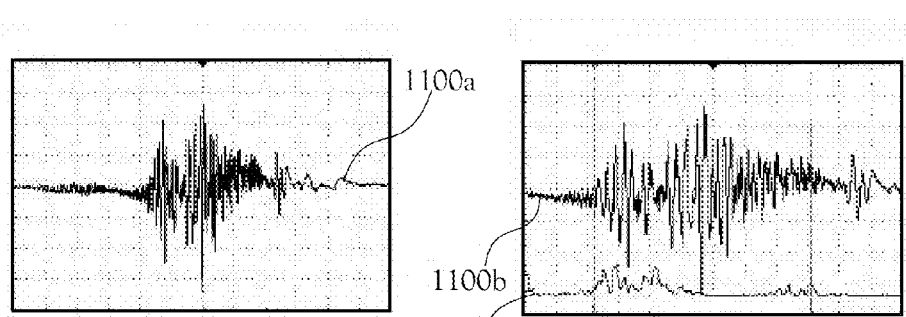
Figures 12A, 12B:
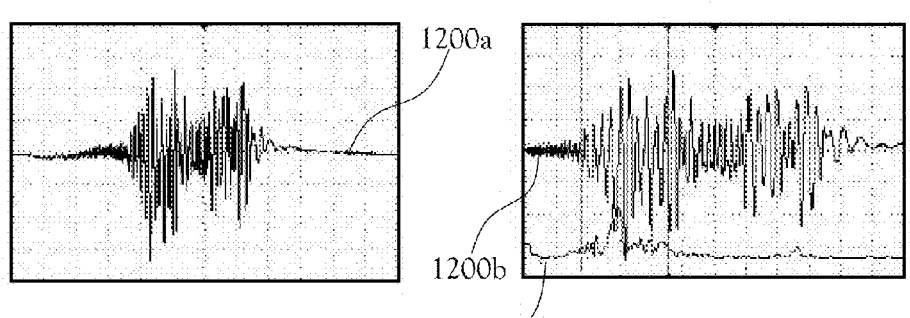

FIG. 6 illustrates a block diagram of one embodiment of the electromechanical system 600 of the probeless bark deterrent apparatus 100. The illustrated embodiment of the electromechanical system 600 includes a power supply 602, a voltage reference 604, a voltage booster 606, a boost monitor 608, a mechanical vibration sensor 610, an audio sensor 616, a microcontroller 622, a user interface 624, and an animal interface 630.

The microcontroller 622 provides the necessary logic and control functions to implement bark detection. In one embodiment, the microcontroller 622 is a microcontroller having an onboard analog-to-digital converter (A/D converter) and wake-up input, such as the PIC 16F684 from Microchip Technology Incorporated. The A/D converter enables high resolution sampling of the inputs from the vibration sensor 610 and the audio sensor 616 to facilitate enhanced bark detection. In another embodiment, the microcontroller includes one or more comparators accepting inputs from the vibration sensor 610 and/or the audio sensor 616 to the microcontroller 622. As used herein, the term "microcontroller" refers to any control device or circuit including controllers, microcontrollers, processors, microprocessors, digital signal processors (DSP), state machines, programmable intelligent computers (PIC), programmable logic arrays (PLA), or discrete logic circuits, which provide processing, logical control, decision making, and/or control capability for implementing the functions described herein. In another embodiment, the A/D converter or the comparators are separate components from the microcontroller.

In the illustrated embodiment, the probeless bark deterrent apparatus 100 includes both a vibration sensor 610 and an audio sensor 616. Although both the vibration sensor 610 and the audio sensor 616 are considered microphones, their design, use, and characteristics are different. The primary purpose and design of the vibration sensor 610 is to detect vibrations moving in a transmission medium other than air, i.e., vibrations localized to the dog wearing the probeless bark deterrent apparatus 100. The primary purpose of the audio sensor 616 is to detect ambient sounds moving through air in a selected frequency range, i.e., ambient sounds not necessarily localized to the dog.

The vibration sensor 610 is an electromechanical system that detects mechanical vibrations through contact with the dog, converts the mechanical vibrations into electrical signals, and filters and amplifies the electrical signals for analysis. The vibration sensor 610 includes the housing 102, which serves as a conduit making direct contact with the dog and propagating mechanical vibrations, a vibration transducer 612, and a vibration amplifier 614. In certain applications, the housing 102 is set off from the dog by a pair of electrodes 202 (see FIG. 2). The electrodes 202 used with the probeless bark deterrent apparatus 100 are of the rigid type and are fixedly secured to the housing 102, virtually eliminating any movement independent of the housing 102 and effectively making the electrodes 202 functionally part of the housing 102 with respect to the communication of mechanical vibrations. One skilled in the art will appreciate the significant design differences between an electrode and the external, protruding vibration probes known in the art. For a detailed review of the state of the art in bark deterrent devices using external, protruding probes, the reader is referred to the Description of the Related Art earlier in this document.

A vibration transducer 400 is placed in direct mechanical contact with the housing 102 as shown and described by way of FIGS. 4 and 5 and the accompanying description. As previously discussed the vibration transducer 400 senses strain and vibrations in the housing 102 and converts those to electrical signals for analysis and processing. The vibration transducer 400 is a microphone having low open-circuit sensitivity (i.e., sensitivity to airborne sounds [V/Pa]) and high vibration sensitivity [V/(m/s)$^2$] adapted for detecting vibrations moving in a transmission medium other than air. A secure bond between the housing 102 and the vibration transducer 400 is desirable for improved detection of strain and vibration. In one embodiment, the vibration transducer 400 is a piezoelectric vibration transducer, which produces a small-amplitude electrical signal proportional to the incident acceleration forces. A piezoelectric vibration transducer generally has low open-circuit sensitivity (i.e., sensitivity to airborne sounds [V/Pa]), high vibration sensitivity [V/(m/s)$^2$], large dynamic range, high dc output impedance, and low power consumption. Thus, the piezoelectric vibration transducer is well-suited for contact vibration measurement; however, it is not well-adapted for measuring ambient sounds.

The vibration amplifier 614 amplifies and filters the electrical signal from the vibration transducer. Using the capacitance of the vibration transducer 400, the vibration amplifier 614 forms a high-pass filter with a cut-off frequency of approximately 192 Hz. With a closed loop gain of about 21 V/V and a gain bandwidth product of 100 KHz, the high frequency response begins to roll off at about 5 KHz. The resulting signal is the vibration input supplied to the microcontroller 622. Adjusting the closed loop gain of the vibration amplifier 614 produces a corresponding change in the overall sensitivity of the vibration sensor 610 to airborne sounds. At a closed loop gain of approximately 31 V/V, the vibration sensor has a respectably low sensitivity to airborne sound and lowering that gain further reduces that sensitivity.

The audio sensor 616 is an electromechanical system that detects ambient sounds, converts the ambient sounds into electrical signals, and filters and amplifies the electrical signals for analysis. The audio sensor 616 includes an audio transducer 618 and an audio input amplifier 620. The audio transducer is a microphone having high open-circuit sensitivity and low vibration sensitivity adapted for detecting ambient sounds moving through air. In one embodiment, the audio transducer 618 is a condenser microphone. A condenser microphone generally has high open-circuit sensitivity, low vibration sensitivity, large dynamic range, flat frequency response, and high power consumption. Thus, a condenser microphone is well-suited for ambient sound detection and high-quality sound reproduction; however, it is not well-adapted for measuring contact vibrations. The microcontroller 622 controls the power to activate and deactivate the audio input transducer 618 directly.

The audio input amplifier 620 amplifies and filters the electrical signal produced by the audio input transducer 618. In conjunction with the audio input transducer impedance, a high-pass filter with a cut-off frequency of approximately 110 Hz is formed. The closed-loop gain of the audio input amplifier 620 is approximately 24 V/V. The microcontroller 622 receives and analyzes the output of the audio input amplifier 620. The microcontroller 622 also controls the quiescent operating point or bias voltage of the audio input amplifier 620. In one embodiment where the A/D converter of the microcontroller digitizes the audio input amplifier 620 frequency, the microcontroller 622 sets the bias voltage to one-half of the supply voltage in order to maximize the dynamic range of the signal. In another embodiment using a comparator to supply the input to the microcontroller 622, a lower bias voltage is required.

Although the vibration sensor 610 has adequate bark detection, the higher quality signals that are obtained from the audio input sensor 616 leads to more accurate bark detection and allows for more sophisticated bark processing. However, the high current draw of the audio sensor 616 quickly depletes the power supply 602 if left on continuously so it remains off most of the time to maximize battery life. Because of its low power consumption, the vibration sensor 610 runs continuously for preliminary bark detection. When the vibration sensor 610 produces a signal with a potential bark signal, the microcontroller 622 activates the audio sensor 616 only long enough to sample the ambient sound, which is analyzed for conclusive bark detection. This technique is described in detail in U.S. Pat. No. 5,927,233, the contents of which are incorporated by reference. In an alternate embodiment, the audio sensor 614 is omitted and all bark detection is accomplished using the vibration sensor 610.

The power supply 602 provides the power to operate the electromechanical system 600. The power supply 602 is a portable power source capable of supplying the necessary current to drive the electronics and electromechanical elements of the probeless bark deterrent apparatus 100. In one embodiment, the power supply 602 is a battery, which may be either disposable or rechargeable.

In one embodiment, the voltage reference 604 is a CMOS, low-dropout, micro-power voltage regulator. One function of the voltage reference 604 is to provide an absolute reference voltage used to bias the vibration amplifier 614. In one embodiment, the voltage reference 604 employs a voltage divider to establish the reference voltage for the vibration amplifier 614. The output of the vibration amplifier 614 is connected to the wake-up input of the microcontroller 622. When the vibration amplifier output falls below a predetermined threshold voltage as a result of bark detection through the vibration sensor 610, the microcontroller 622 wakes up from the low-power sleep state and begins processing. In one embodiment, the wake-up threshold voltage is approximately one-half of the reference voltage. However, the wake-up threshold voltage is not tightly controlled; it changes with temperature, process variations, etc. In addition, collar position and tension, physical differences in pets, and other outside variables have been found to have a greater impact on the vibration sensor wakeup sensitivity.

The voltage booster 606 is a gain stage increasing the voltage supplied by the power source 604 to a level suitable for biasing the other components such as the transformer driver 640 and the solenoid driver 648 with increased power requirements. The operation of the voltage booster 606 can result in significant power supply voltage droop that is significant enough to affect the microcontroller and the analog front end. In one embodiment, the electromechanical system protects against power supply voltage droop by isolating the microcontroller and the analog front end from the battery, for example with a zener diode, and providing a capacitor capable of storing sufficient energy to maintain the supply voltage level during operation of the voltage booster 606. In an alternate embodiment, the voltage booster 606 is duty cycled to avoid excessive power supply voltage droop.

The boost monitor 608 provides an output that allows the microcontroller 622 to rapidly sample the boost voltage. In one embodiment, the boost monitor 608 is a low-impedance voltage divider. The rapid sampling of the boost voltage that is enabled by the boost monitor 608 allows the microcontroller 622 to monitor and control the boost conversion current by duty-cycling the voltage booster 606 to limit the power supply voltage droop to an acceptable level. Using duty cycling to control the power supply voltage drop eliminates the need for protection components such as the zener diode. By eliminating power-consuming components, battery life is extended.

Another function of the voltage reference 604 is to allow the microcontroller 622 to determine the instant voltage of the power supply 602. The microcontroller 622 infers the instant voltage of the power supply, $V_{BAT}$, from a digital representation of the output of the voltage reference 604 and the forward voltage drop of the power supply according to the equation $$V_{BAT} = 2^{10}\left(\frac{V_{REF}}{k}\right) + V_{D2}, \tag{1}$$

where $V_{REF}$ is the reference voltage, k is the digital representation of the supply voltage, and $V_{D2}$ is the forward voltage drop across the zener diode isolating the power supply 602. The accuracy of the power supply voltage measurement is governed primarily by analog-to-digital conversion of the power supply voltage due to ratiometric relationship of k to the power supply voltage. Some additional error occurs because $V_{D2}$ varies with temperature and current, but the error is minimized by measuring the power supply voltage at the appropriate time.

The user interface 624 includes various optional components that provide information about the status the probeless bark deterrent apparatus 100 to a human user. In the illustrated embodiment, the user interface 624 includes a power indicator 626 and a refill indicator 628. In one embodiment, the power indicator is a visual indicator, such as a light-emitting diode (LED) or lamp, which illuminates to indicate the status of the power supply 602. For example, one embodiment employs a dual color red/green LED that flashes green when the power supply 602 carries sufficient charge and red when then remaining charge in the power supply 602 becomes low. If the available charge in the power supply 602 remains low for an extended period of time, the number and/or frequency of the red flashes increases.

One embodiment of the refill indicator 628 is a visual indicator that illuminates to indicate that the reservoir 652 should be refilled or replaced after the spray output mechanism 646 has been activated a specified number of times. Various embodiments of the refill indicator 628 employ one or more different colors lights and use steady or flashing illumination and/or a combination of both. A specific example of the refill indicator is a flashing yellow LED indicating a refill is needed that is automatically turned off when the reservoir is refilled.

One skilled in the art will recognize that alternate user interface elements are available and additional user interface elements may be employed without departing from the scope and spirit of the present invention. For example, audible indicators may be used in place of or in combination with the visual indicators and displays capable of showing textual information can be used in place of an LED. Further, the user interface 624 is not limited to output devices, but may include switches or other input devices to allow the user to configure the probeless bark deterrent apparatus 100, such as a reset switch that allows the user to manual turn off the refill indicator 628 and reset the spray count or a deterrent intensity selector switch.

The animal interface 630 includes any of the various mechanisms for communicating with the animal, i.e., applying a stimulus to the animal. The illustrated embodiment of the animal interface 630 includes an audio output mechanism 632, a static output mechanism 638, and a spray output 646 representing several optional stimulus delivery mechanisms used in electronic animal training; however, other stimulus delivery mechanisms can be used without departing from the scope and spirit of the present art. The illustrated audio output mechanism 632 includes an audio driver 634 driving the audio output transducer 636, which may be a speaker or piezoelectric transducer. The illustrated static output mechanism 638 includes a transformer driver 640 for providing an input to the input side of a transformer 642. The voltage on the output side of the transformer is applied to the dog through the electrodes 644. The illustrated spray output mechanism 646 includes a solenoid driver 648 activating a solenoid 650 which releases a fluid deterrent from a reservoir 652 through a spray deterrent outlet port 654.

Typically, the audio output mechanism 632 is considered a warning stimulus while the static output mechanism 638 and the static output mechanism 646 are considered correction stimuli. One skilled in the art will recognize that the animal interface 630 in an electronic animal training device generally include one form of warning stimulus and one form of correction stimulus. Accordingly, one embodiment of the animal interface 630 would include the audio output mechanism 632 and the static output mechanism 638. Another embodiment of the animal interface 630 would include the audio output mechanism 632 and the spray output mechanism 646. Other embodiments of the animal interface 630 would include the static output mechanism 638 or the spray output mechanism 646 without the audio output mechanism 632.

Figure sets 7-12 are captures of the waveforms of six barks obtained from one embodiment of the probeless bark deterrent apparatus 100 with the leadless side of a 15 mm piezoelectric disc secured in a recess in the sidewall of the housing using a cyanoacrylate-based adhesive. Electrically, the piezoelectric disc has a 14.3 nF capacitance coupled with an 82 k$\Omega$ resistor to form a high-pass filter with a cut-off frequency of 135 Hz and the vibration amplifier has gain of 15.1 V/V and 2-pole low-pass filter with a cut-off frequency of 2200 Hz. FIGS. 7A-12A depict the raw bark waveform 700a-1200a for the entire bark sampled at 5.00 kilosamples per second (ksps) on a single channel. FIGS. 7B-12B depict a portion 700a-1200a of the raw bark waveform in the time domain with the time scale expanded and the voltage scale increased and the corresponding frequency domain transform 702b-1202b obtained using a fast Fourier transform algorithm.

Figure sets 7-10 were obtained using a snug collar fit, i.e., a proper fit for a typical bark deterrent apparatus. The results of testing shown in Figures sets 7-10 indicate that the probeless bark detection apparatus has good sensitivity over the desired frequency range and the output of the mechanical vibration sensor is useable for bark detection and/or discrimination. Figure sets 11 and 12 were obtained after loosening the collar so that it no longer fit snugly, a probable occurrence for a pet owner afraid of over-tightening the collar around the dog's neck. Although the resulting waveforms have smaller amplitude and are less clear than those obtained using a proper fit, the frequency domain analysis indicates that the output remains usable for bark detection and/or discrimination.

In operation, the probeless bark deterrent apparatus 100 is secured to the neck of a dog using a collar or similar device and centered on the dog's throat. When the dog barks, the entire housing vibrates primarily due to direct physical contact between the electrodes/housing and the dog's vibrating throat and airborne sound waves making incident contact with the housing. The forces on the housing resulting from contact with the dog's throat have radial and lateral components, creating corresponding strains in the housing walls. Because the vibration transducer 400 is bonded to the inside of the housing, the housing strains are coupled to the vibration transducer. When the vibration transducer 400 experiences strain, it produces a corresponding electrical signal. The microcontroller 622 analyzes the output of the signal and determines whether or not the signal actually represents a bark, such as the waveforms illustrated in Figure sets 7-12. Other non-bark events, such as scraping, bumping, or scratching the housing or collar, can cause strains on the housing and passed to the vibration transducer. Rejecting the extraneous signals produced by these events is essential to reliable bark detection.

Figure 13:
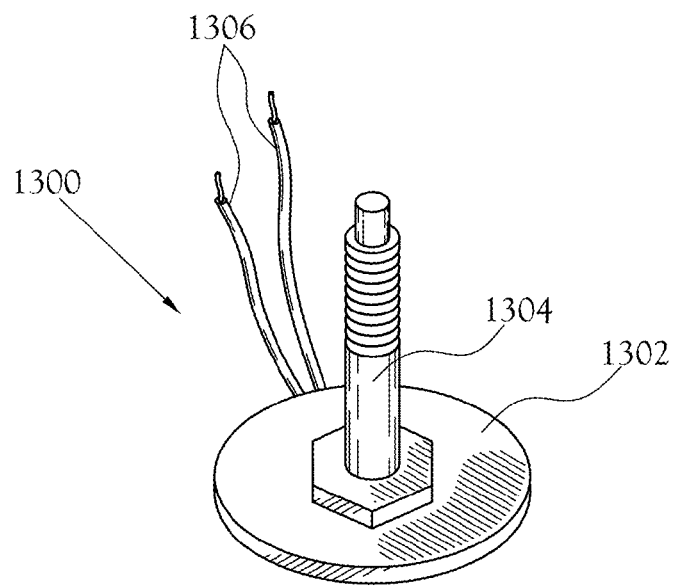
FIG. 13 is an illustration of an alternate embodiment of the mechanical vibration transducer including an internal weight.

During testing, a probeless bark deterrent apparatus using the base vibration transducer 400 shown in FIGS. 4 and 5 was compared to a probeless bark deterrent apparatus using a vibration transducer with an attached mass configured shown in FIG. 13. The attached-mass vibration transducer 1300 illustrated in FIG. 13 is essentially the prior art vibration probe except that it protrudes inwardly and does not require a plastic cap over the rigid post. The attached-mass vibration transducer 1300 includes a sensing element 1302, such as a piezoelectric disc, a mass member 1304 secured to and extending from the sensing element 1302, and a pair of electrical leads 1306. As with the base vibration transducer 400, the sensing element 1302 was attached to the interior surface of the housing with the mass member remaining within the housing.

In the presence of a real bark, both vibration transducers 400, 1300 performed well. However, the attached-mass vibration transducer 1300 much more readily produced vibration signals caused bumping, scraping, and scratching the housing that were very similar to the signals produced by a real bark and resulted in false triggers. In pendulum mode, the attached-mass vibration transducer 1300 resonates at about 1.3 KHz in response to striking the housing of the probeless bark deterrent apparatus laterally on a table. Following the lateral strike, the mass continued to oscillate for a period of time with substantial amplitude before decaying. The resulting signal was detected as a real bark. False triggers occurred in approximately 50% of the lateral strikes using the attached-mass vibration transducer 1300. In contrast, the same lateral strike using the base vibration transducer 400 produced a low-amplitude signal of relative short duration and rapid decay. The signal characteristics make it unlikely to be mistaken for a real bark. With regard to airborne sound, the attached-mass vibration transducer 1300 proved to be more sensitive to airborne sound than the base vibration transducer 400.

Next, each probeless bark deterrent apparatus was attached to animal and the closed-loop gain was adjusted until the vibration sensitivities were equal. One the gain was adjusted, the devices were removed and placed on a soft mat to test the open-circuit sensitivity to a loud barks occurring nearby. The attached-mass vibration transducer 1300 detected barks occurring within approximately eight inches. The base vibration transducer 400 only detected barks occurring within approximately three inches. When worn on the neck, the dampening effect further reduces the open-circuit sensitivity.

Both versions of the vibration transducer 400, 1300 proved capable of bark detection. The test results indicate that the attached-mass vibration transducer 1300 offers no advantage over the base vibration transducer 400. The attached mass 1302 did not improve ability to detect real barks but impaired the ability to reject non-bark events due to oscillation of the mass. The attached mass 1302 also renders the vibration transducer more susceptible to detecting airborne sounds. Clearly, the attached mass influences the signal produced when the housing is vibrated. For the typical bark deterrent application contemplated herein, the base vibration transducer 400 is easier to implement; however, in certain applications and/or situations, an attached-mass vibration transducer 1300 using the configuration described herein or an alternative configuration potentially offers advantages for bark detection.

Figure 14:
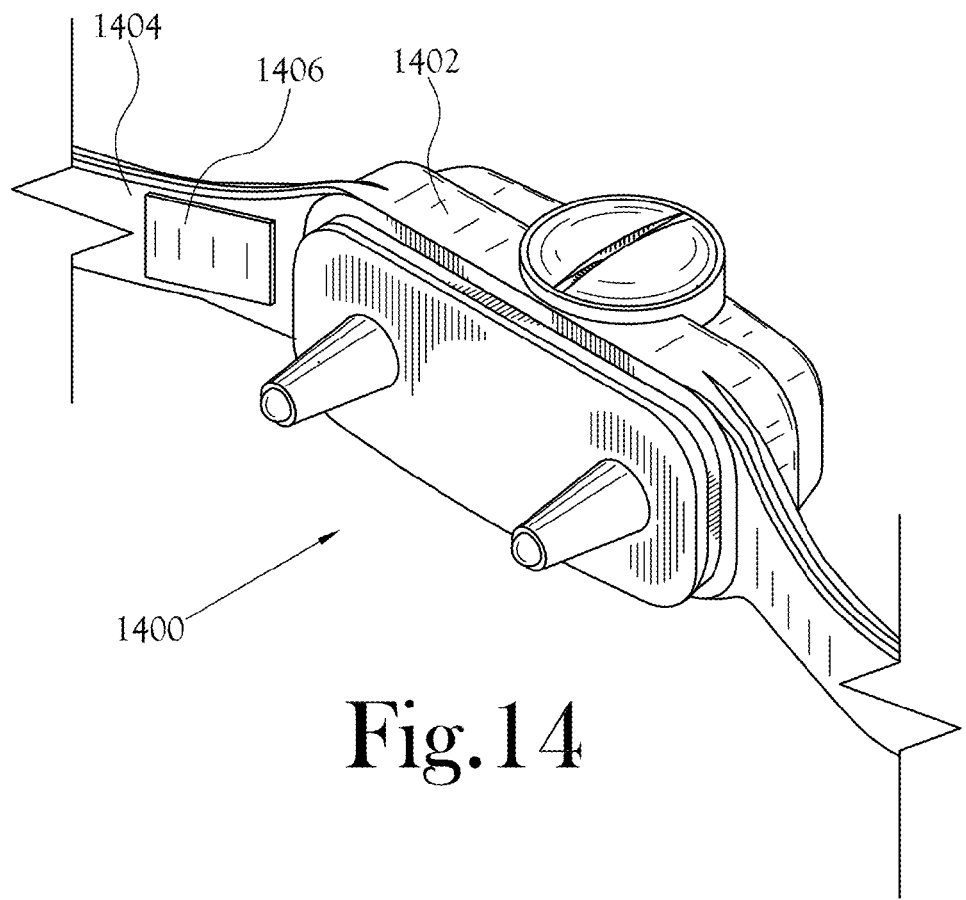
FIG. 14 is an illustration of an embodiment of a probeless bark deterrent apparatus with the mechanical vibration transducer located outside of the housing on the collar that performed poorly in testing.

During testing, detecting collar vibrations was explored as a possible approach to developing a probeless bark deterrent apparatus. FIG. 14 illustrates a perspective view of one collar vibration prototype 1400 tested by the present inventors. The prototype 1400 included a housing 1402, a collar 1404, and a vibration sensor with the vibration transducer 1406 attached to the collar 1404 proximate to the housing 1402. This configuration produced poor bark detection results. An alternate version with the vibration transducer 1406 attached to the collar 1404 farther away from the housing produced marginally better but still poor bark detection results. It was determined that the vibration transducer 1406 attached to the collar 1404 was sensitive to tension strain in the collar 1404 but did not detect the audio frequency vibrations.

One skilled in the art will appreciate that the electrical systems, components, circuits, sub-circuits, and stages described herein can be implemented in various ways to accomplish the desired functions without departing from the scope and spirit of the present invention. Specifically, the electronics can be implemented using analog or digital components or a combination of both. The components may be discrete components, singularly packaged, or integrated circuits. The present application discusses the major electrical systems, components, circuits, sub-circuits, and stages; however, additional electrical systems, components, circuits, sub-circuits, and stages may exist. Further, one skilled in the art will recognize that biasing components, filters, interfaces, multiplexers, amplifiers, and other common devices used for routine functions may not be described; however, implementation of these routine functions will vary based on the actual implementation of the present invention and is deemed to be within the ordinary skill of one in the art.

The specific values and ranges given for time periods, voltages, component values, gains, frequencies, etc., are exemplary with respect to the vibration sensor 610 and the audio sensor 614 and are not intended to be limiting.

It should be appreciated that while the present application refers to dogs and barks, application can be made to other animals and sounds without departing from the scope and spirit of the present invention.

While the present invention has been illustrated by description of several embodiments and while the illustrative embodiments have been described in detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the scope or spirit of the general inventive concept.

Having described the aforementioned invention, What is claimed is:

1. An apparatus for deterring a dog from barking, said apparatus comprising:
    a housing adapted to be attached to a collar and worn about the neck of the dog, said housing having an interior surface and an exterior surface, said exterior surface adapted to be held in close proximity to the throat of the dog by the collar, said housing being fabricated from a substantially rigid material;
    a vibration sensor comprising a vibration transducer with a first surface secured in physical contact with said housing interior surface by a vibratory conductive bond to transfer vibrations produced by the dog to said vibration transducer, and a second surface suspended in air, said vibration sensor detecting said vibrations moving in a medium other than air and producing a vibration signal corresponding to said vibrations;
    a microcontroller in communication with and responsive to said vibration sensor, said microcontroller adapted to analyze said vibration signal and determine whether said vibration signal approximates a bark; and
    a stimulus mechanism activated by said microcontroller following a determination that said vibration signal approximates a bark, said stimulus mechanism adapted to deliver a stimulus to the dog.

2. The apparatus of claim 1 further comprising an audio sensor carried by said housing, said audio sensor being in communication with said microcontroller, said audio sensor adapted to detect audible sounds and generate an audio signal, said microcontroller adapted to analyze said audio signal and determine whether said audio signal corresponds to a bark, said stimulus mechanism activated by said microcontroller following a determination that said vibration signal approximates a bark and a determination that said audio signal corresponds to a bark.

3. The apparatus of claim 1 wherein said housing further defines an inward portion, said inward portion adapted to be placed in contact with the throat of the dog when said apparatus is worn by the dog, and said vibration transducer being secured to said inward portion.

4. The apparatus of claim 1 wherein said stimulus mechanism further comprises a pair of electrodes fabricated from a substantially rigid material, said housing further defining an inward portion adapted to be positioned proximate to the throat of the dog when said apparatus is worn by the dog, said pair of electrodes extending from said inward portion, said pair of electrodes adapted to engage the throat of the dog when said apparatus is worn by the dog, said housing and said pair of electrodes forming a vibration transmission medium.

5. The apparatus of claim 1 wherein said vibration sensor further comprises a vibration amplifier in communication with said vibration transducer, said vibration amplifier amplifying said vibration signal and removing frequencies outside of a selected frequency range from said vibration signal.

6. The apparatus of claim 1 wherein said vibration transducer is secured to said interior surface using an adhesive.

7. The apparatus of claim 1 wherein substantially all of said first surface engages said interior surface.

8. The apparatus of claim 1 wherein said vibration sensor has a vibration sensitivity and an open-circuit sensitivity, said vibration sensitivity being greater than said open-circuit sensitivity.

9. An apparatus for deterring a dog from barking, said apparatus comprising:
- a housing adapted to be attached to a collar and worn about the neck of the dog, said housing having an interior surface and an exterior surface, said exterior surface adapted to be held in close proximity to the throat of the dog by the collar, said housing being fabricated from a substantially rigid material;
- a vibration sensor comprising a vibration transducer having a substantially planar surface secured in physical contact with a substantially planar portion of said interior surface allowing said housing to transfer vibrations produced by the dog to said vibration transducer, said vibration sensor detecting said vibrations moving in a medium other than air and producing a vibration signal corresponding to said vibrations;
- a microcontroller in communication with and responsive to said vibration sensor, said microcontroller adapted to analyze said vibration signal and determine whether said vibration signal approximates a bark; and
- a stimulus mechanism activated by said microcontroller following a determination that said vibration signal approximates a bark, said stimulus mechanism adapted to deliver a stimulus to the dog.

10. An apparatus for deterring a dog from barking, said apparatus comprising:
- a housing adapted to be attached to a collar and worn about the neck of the dog, said housing having an interior surface and an exterior surface, said exterior surface adapted to be held in close proximity to the throat of the dog by the collar, said housing being fabricated from a substantially rigid material;
- a vibration sensor comprising a vibration transducer captured within a recess defined by said interior surface of said housing, said vibration transducer having a substantially planar surface in physical contact with a substantially planar portion of said interior surface allowing said housing to transfer vibrations produced by the dog to said vibration transducer, said vibration sensor detecting said vibrations moving in a medium other than air and producing a vibration signal corresponding to said vibrations;
- a microcontroller in communication with and responsive to said vibration sensor, said microcontroller adapted to analyze said vibration signal and determine whether said vibration signal approximates a bark; and
- a stimulus mechanism activated by said microcontroller following a determination that said vibration signal approximates a bark, said stimulus mechanism adapted to deliver a stimulus to the dog.

* * * * *